W. C. UPP.
VIEW CHANGING DEVICE.
APPLICATION FILED MAR. 11, 1912.
1,064,944.
Patented June 17, 1913.
2 SHEETS—SHEET 1.
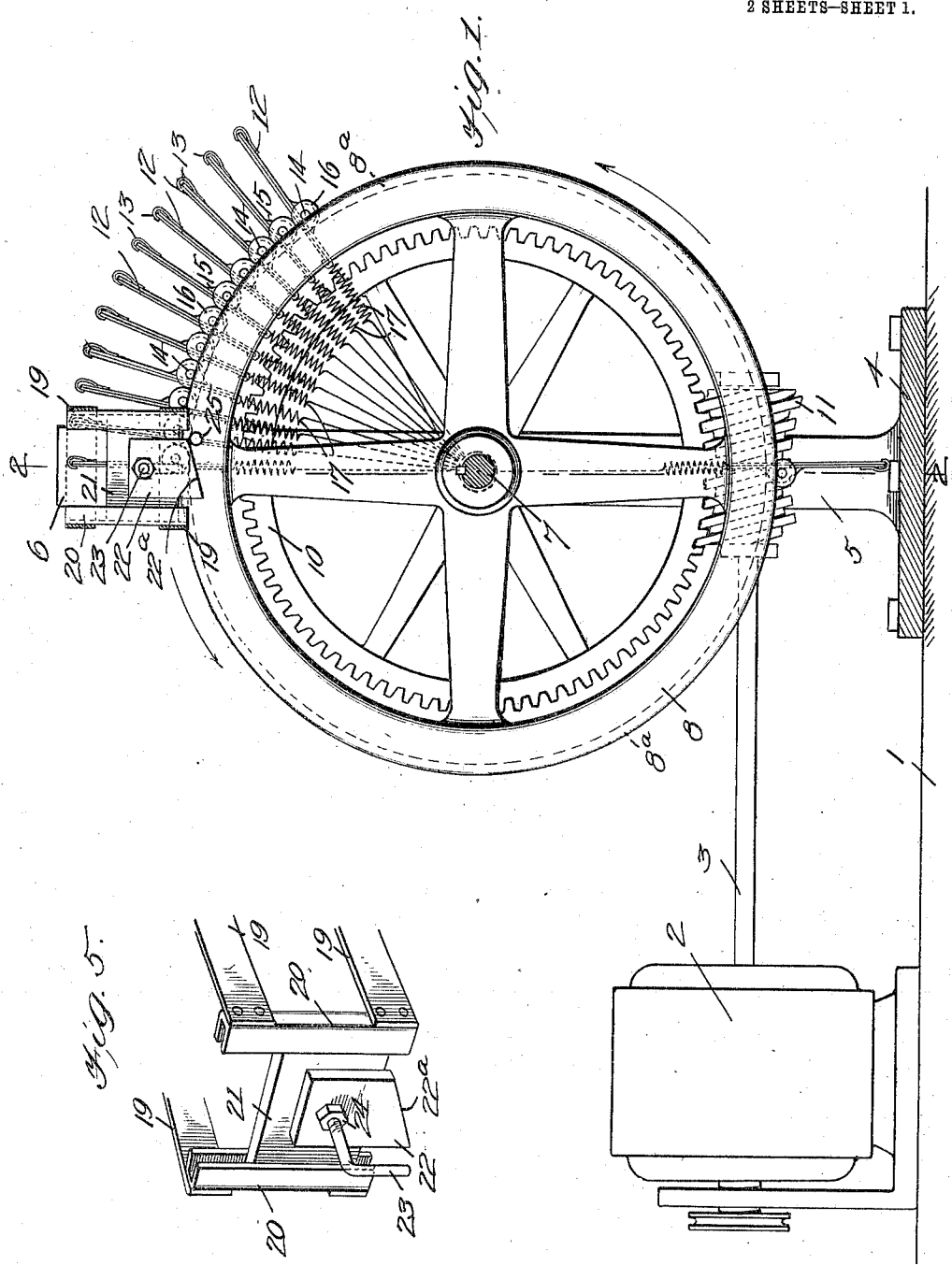
WITNESSES
F. C. Barry
L. H. Stanley
INVENTOR
William C. Upp
BY Munn & Co.
ATTORNEYS

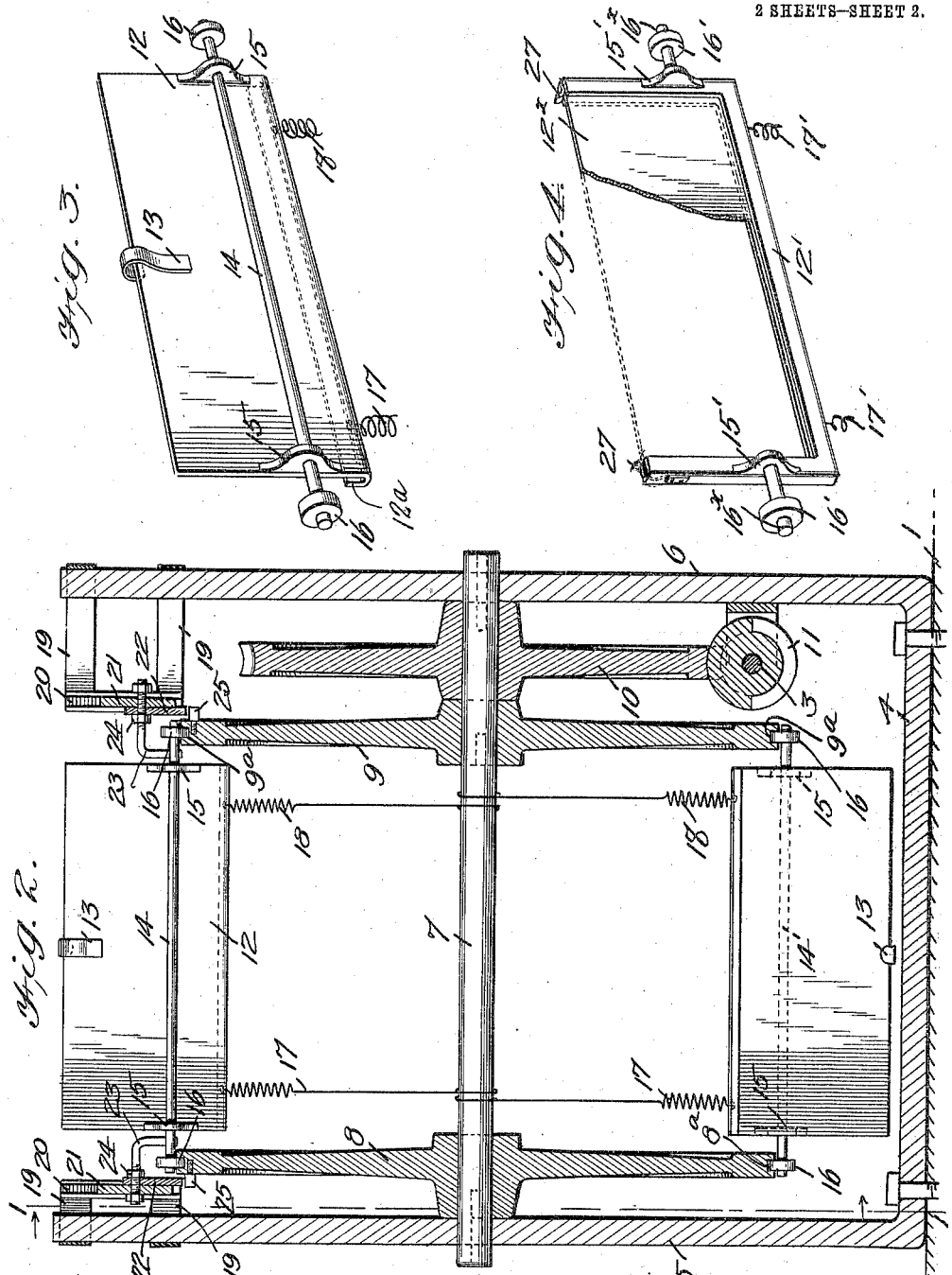

UNITED STATES PATENT OFFICE.

WILLIAM C. UPP, OF BALTIMORE, MARYLAND.

VIEW-CHANGING DEVICE.

1,064,944. Specification of Letters Patent. Patented June 17, 1913.

Application filed March 11, 1912. Serial No. 683,121.

*To all whom it may concern:*

Be it known that I, WILLIAM C. UPP, a citizen of the United States, and a resident of Baltimore, in the State of Maryland, have made certain new and useful Improvements in View-Changing Devices, of which the following is a specification.

My invention relates to improvements in automatic means for changing or shifting views in projecting apparatus, and it consists in the combinations, constructions, and arrangements herein described and claimed.

The main object of my invention is to provide an automatic view shifting device which will accommodate a large number of views, and which will bring one view into position to be projected upon a screen, hold it in position for a predetermined time, and then permit the next view to be brought into position, this operation continuing so that all the views in succession are treated similarly.

A further object of my invention is to provide novel means for holding and releasing the views.

A further object of my invention is to provide a device having a plurality of view carriers, with novel means for mounting the carriers so as to be brought successively into operative relation for projection upon a screen.

Other objects and advantages will appear in the following specification, and the novel features of the invention will be particularly pointed out in the appended claims.

My invention is illustrated in the accompanying drawings forming part of this application in which—

Figure 1 is a sectional view along the line 1—1 of Fig. 2, looking in the direction of the arrows, Fig. 2 is a section along the line 2—2 of Fig. 1, Fig. 3 is a perspective view showing the construction of a view carrier, Fig. 4 is a perspective view showing a modified form of view carrier, and Fig. 5 is a perspective view showing in detail the automatic stop.

As stated before the device is designed to be used primarily with projecting apparatus, such as stereopticons or reflecting devices. Inasmuch as the arrangement of the optical features forms no part of this invention, I have omitted them for the sake of clearness.

In carrying out my invention, I provide a base 1, upon which is mounted a motor 2, which is connected with a shaft 3 in any suitable manner, so as to impart motion to the latter.

At 4, I have shown a base upon which is mounted the uprights 5 and 6 respectively, a shaft 7 being journaled in the uprights as shown in Fig. 2. Keyed to the shaft 7 between the uprights 5 and 6 are a pair of wheels 8 and 9 respectively, having peripheral grooves, such as those shown at $8^a$ and $9^a$. The shaft 7 is also provided with a worm gear 10 arranged to be engaged by the worm 11 on the shaft 3.

The view carriers are of the form shown in Fig. 3. For carrying opaque objects such as postal cards, colored pictures and the like, the carrier is made of a sheet 12 of light material, such as sheet metal, provided with a U-shaped bend $12^a$ at one end arranged to receive the card, and having a spring hook 13 secured to the back of the carrier for holding the top of the card. Each carrier is mounted upon a shaft 14 which extends through the brackets 15, and is provided with wheels or rollers 16, which are loosely mounted with respect to the shaft 14.

As will be seen from Fig. 2 the wheels or rollers 16 are mounted to travel in the grooves $8^a$ and $9^a$ in the peripheries of the wheels 8 and 9 respectively. Each carrier is connected by means of springs 17 and 18 to the central shaft 7, the end of the wire 17 and 18 being preferably looped around the shaft 7, so as to permit the latter to slip within the loop.

Secured to the uprights 5 and 6 are a pair of stop devices like that shown in Fig. 5. A description of one of these devices will suffice since they are both the same. The arms 19 carry at their extremities U-shaped runways 20 arranged to receive a slidable plate 21. This plate has secured to it, on one side thereof, a cam member 22 having a cam surface $22^a$. An L-shaped stop pin 23 passes through the plates 21 and 22, nuts 24 being used to hold these members together, as shown in Figs. 2 and 5.

From the foregoing description of the various parts of the device the operation thereof may be readily understood. The motor 2 is started in any suitable manner and the revolution of the shaft 3 causes the revolution of the shaft 7 and the wheels 8 and 9 through the medium of the worm and gear. A number of carriers 12, each having a view are provided. The number of carriers is only limited by the circumference of the wheels 8 and 9. As the carriers take up very little room, it will be seen that a very large number of views may be carried by the device. Consider now Fig. 2. In this position it will be seen that the L-shaped stop members 23 extend downwardly so as to engage the shaft 14 of that particular carrier which is about to come into position. The carrier therefore will be prevented from movement with the wheels 8 and 9 and the other carriers which have been carried around by the wheels, owing to the spring tension of the rollers 16 will bank up behind the carrier which is held by the stops 23. In Fig. 1, I have shown the condition just prior to the release of the carrier which is held by the stop 23. It will be observed that a pin 25 is provided for each wheel. These pins simultaneously engage the cam surfaces 22$^a$ of the cam plates 22 and push the plates upwardly. As the plates are pushed upwardly the stop members 23 are raised so as to permit the forward movement of the carrier. The carrier is now carried around by the wheel in the direction indicated by the arrow in Fig. 2, since the springs 17 cause sufficient friction of the rollers 16 to impart the motion of the wheel to the separate carriers. Immediately after the pins 25 leave the plates 22, the latter drop so as to bring the stop members in front of the next carrier. The wheels carrying the pins will now revolve one complete revolution before the pins again engage the cam members, the carrier remaining in place all this time. As soon as the pins engage the cam members the next plate is released and so on. It will then be seen that the carriers are held in position and are released at stated intervals. This interval may be varied by providing more pins on the sides of the wheels 8 and 9. Thus where two pins are provided the interval is one-half, where four pins are provided the interval is one-quarter as long, etc. In Fig. 1, I have shown eleven carriers, but obviously a much greater number or a smaller number might be used.

The mechanism, as before stated, is designed to bring carriers successively to a given point, and there to permit each carrier to remain at rest for a stated interval. The views may be projected by reflected or transmitted light by reflecting apparatus or the ordinary stereopticon as the case may be.

When stereopticon is used the carrier is made of the form shown in Fig. 4. In this form a U-shaped frame 12' is provided having grooves for receiving a transparent plate 12$^x$. The lugs 15' each carry stub shafts, such as those shown at 16$^x$, the wheels 16' being mounted on the stub shafts. The transparent plate 12$^x$ is held in position by means of springs 27 at the ends of the U-shaped frame 12'. In this form of carrier as in the form shown in Figs. 1 and 2, springs 17' connect the carrier with the shaft 7.

I am aware that other forms of the device might be based upon the same general idea might be made, but I consider as my own all such modifications as fairly fall within the spirit and the scope of the invention.

I claim:—

1. In an automatic view shifting device, a frame, a shaft carried thereby, a pair of wheels carried by said shaft, a series of carriers arranged to travel on the peripheries of the wheels, and means for retaining each of said carriers successively in a fixed position for a predetermined period.

2. In an automatic view shifting device, a frame, a shaft carried thereby, a pair of wheels carried by said shaft, a series of carriers arranged to travel on the peripheries of the wheels, means for retaining each of said carriers in radial positions with respect to the axis of the shaft, and means for retaining each of said carriers successively in a fixed position for a predetermined period.

3. In an automatic view shifting device, a frame, a main shaft carried thereby, a pair of wheels carried by said shaft, each of said wheels being provided with a peripheral groove, a series of carriers, each carrier being provided with an auxiliary shaft, an anti-friction member rotatably carried by said auxiliary shaft at each end thereof and arranged to travel in the groove on one of said wheels, spring means connecting said carrier with said main shaft, and means for retaining each of said carriers successively in a fixed position for a predetermined period.

4. In an automatic view shifting device, a frame, a main shaft carried thereby, a pair of wheels carried by said shaft, each of said wheels being provided with a peripheral groove, a series of carriers, each carrier being provided with an auxiliary shaft, an anti-friction member rotatably carried by said auxiliary shaft at each end thereof and arranged to travel in the groove on one of said wheels, spring means connecting said carrier with said main shaft, means for retaining each of said carriers successively in a fixed position for a predetermined period, said means comprising a movable cam member, a stop carried by said cam member for engaging the auxiliary shafts of said carriers, and pins carried by said wheels for moving said cam, thereby causing the withdrawal of the stop member from the auxiliary shaft.

5. In an automatic view shifting device, a frame, a main shaft rotatably carried thereby, means for rotating the shaft, a pair of grooved wheels mounted on said shaft, a series of carriers, each carrier comprising a view retaining member, an auxiliary shaft secured to the view retaining member, antifriction members rotatably carried by said auxiliary shaft and arranged to travel in the grooves in said wheels, springs secured to the inner portions of said carriers and being connected with the main shaft, arms secured at the upper ends of said frame, runways secured to each of said arms, a cam member for each wheel slidably disposed in said runways, each of said cam members being disposed between its individual wheel and its supporting frame member, an L-shaped stop member carried by said cam member and having a portion arranged to engage said auxiliary shafts, and a pin carried by each of said wheels on the outer sides thereof for engaging said cam members.

6. In an automatic view shifting device, a frame, a shaft carried thereby, a pair of wheels carried by said shaft, a series of carriers arranged to travel on the peripheries of the wheels, means for retaining each of said carriers successively in a fixed position for a predetermined period, said wheels being provided with means to release the retaining means to permit the forward movement of the carriers.

7. In an automatic view shifting device, a frame, a shaft carried thereby, a pair of wheels carried by said shaft, a series of carriers arranged to travel on the peripheries of said wheels, means for retaining each of said carriers in radial positions with respect to the axis of the shaft, means for retaining each of said carriers successively in a fixed position for a predetermined period, said wheels being provided with means to release the retaining means to permit the forward movement of the carriers.

WILLIAM C. UPP.

Witnesses:
R. A. MacNicholl,
J. K. Meyer.

---

Copies of this patent may be obtained for five cents each, by addressing the "Commissioner of Patents, Washington, D. C."